United States Patent [19]

Taylor, Jr. et al.

[11] Patent Number: 4,704,237
[45] Date of Patent: Nov. 3, 1987

[54] VACUUM FORMING PROCESS FOR ARTICLES HAVING HIGH FORMING STRESSES

[75] Inventors: Benson T. Taylor, Jr., Floyd's Knobs, Ind.; Robert L. Werkmeister, Shepherdsville, Ky.

[73] Assignee: General Electric Company, Louisville, Ky.

[21] Appl. No.: 902,796

[22] Filed: Sep. 2, 1986

[51] Int. Cl.⁴ .................... B29C 51/10; B29C 51/16; B29C 51/36
[52] U.S. Cl. ................................... 264/40.1; 264/509; 264/547; 264/553; 264/554; 425/173; 425/388
[58] Field of Search ............... 264/40.1, 509, 547–551, 264/553, 554; 425/169, 173, 387.1

[56] References Cited

U.S. PATENT DOCUMENTS

| | | | |
|---|---|---|---|
| 2,289,084 | 7/1942 | Temple | 264/510 |
| 2,643,417 | 6/1953 | Smith | 264/509 |
| 2,889,651 | 6/1959 | Baldanza | 264/509 |
| 3,019,488 | 2/1962 | Doyle et al. | 18/56 |
| 3,022,614 | 2/1962 | Dreyfus et al. | 53/30 |
| 3,072,969 | 1/1963 | DuBois | 18/55 |
| 3,084,389 | 4/1963 | Doyle | 18/19 |
| 3,219,307 | 11/1965 | Leeds et al. | 264/509 |
| 3,294,881 | 12/1966 | Wadlinger | 264/553 |
| 3,308,213 | 3/1967 | Carrigan et al. | 264/90 |
| 3,496,143 | 2/1970 | Siggel et al. | 260/75 |
| 3,873,659 | 3/1975 | Smith | 264/549 |
| 4,256,690 | 3/1981 | Sabba | 264/504 |
| 4,537,732 | 8/1985 | Ueda et al. | 264/40.1 |
| 4,618,465 | 10/1986 | Parks | 264/40.1 |

FOREIGN PATENT DOCUMENTS

| | | | |
|---|---|---|---|
| 1396599 | 3/1964 | France | 425/388 |
| 53-51264 | 5/1978 | Japan | 264/550 |

Primary Examiner—Jan H. Silbaugh
Assistant Examiner—James Bartholomew
Attorney, Agent, or Firm—Frederick P. Weidner; Radford M. Reams

[57] ABSTRACT

An improved vacuum forming process for forming a deep drawn plastic article with a flange in an area of high forming stresses wherein a mold mounted on a base forms the shape of the article. A sheet of hot plastic material is placed over the mold and a vacuum is drawn to form the plastic sheet into the shape of the mold to form the article. The improvement is forming a character in the mold portion that forms the flange in the area of the high forming stress, said character having dimensions such that properly heated plastic sheet material will be imprinted with a predetermined clarity during the molding operation. A heated sheet of plastic material is placed over the mold and a vacuum is drawn to draw the plastic material around the mold including the mold portion that forms the flange in an area of high forming stresses. The plastic material is then solidified and removed from the mold. The flange is visually inspected to determine if the imprinted character has the predetermined clarity. If it does, the plastic material was heated to the proper temperature for the molding operation. If it does not, it means that the plastic material was not heated to the proper temperature and the area will be subjected to stress cracking and therefore the article is defective and should be discarded.

3 Claims, 8 Drawing Figures

VACUUM FORMING PROCESS FOR ARTICLES HAVING HIGH FORMING STRESSES

BACKGROUND OF THE INVENTION

Vacuum forming by removing the air from between thin plastic sheet and a mold is well known. Such a process is utilized in forming household refrigerator liners which are relatively large. In the usual vacuum forming process the mold is made of aluminum and the plastic sheet is heated and blown into a bubble. The mold is then placed inside the bubble and a vacuum is drawn so that the bubble collapses to conform to the shape of the mold. Upon cooling the plastic material solidifies and permanently assumes the shape of the mold. The air is pulled or vacuumed through small holes over most of the surface of the mold and sucked into a large vacuum storage tank by a vacuum pump. In such a process the plastic material forming areas of the back of the liner contact the mold and solidify first. As the remaining air is removed from the areas forming the top, sides, and bottom of the liner, the plastic material is stretched and thinned and as the thinned plastic material is drawn down against the mold the remaining plastic material has to stretch further. In order to have the complete article properly formed it is important that the sheet of plastic material has been heated to the proper elevated temperature for the molding process so that the material will flow and "relax" and thus relieve the stresses in the plastic material that could cause subsequent cracking. This is particularly so in the last portion of the drawn article and in the case of liners for household refrigerators it is the flanged periphery at the open front of the liner that has the area of high forming stresses which is subject to stress cracking. It is very difficult to accurately measure the temperature of the sheet of plastic material to assure that it has reached the proper temperature for molding and therefore it is desirable to be able to provide a means for visually inspecting the final formed plastic article to see if in fact the temperature of the sheet of plastic material was correct and therefore provided adequate flow of the material during the molding process. This is important because subsequent use of the article such as a refrigerator liner if not properly formed in the high stress areas such as the peripheral flange can result in cracking some time during or subsequent to assembly of the liner into the refrigerator. It is therefore desirable to determine if the liner has been formed correctly prior to assembly of the liner into a refrigerator. Prevention of using improperly formed liners in refrigerators saves material cost and expensive rework in the assembly line of the refrigerator. This also prevents improperly formed liners from being built into refrigerators. These liners could appear satisfactory but subsequently crack when subjected to very low temperatures, such as during shipping in very cold weather. By this invention a process is provided that allows visual inspection of a deep drawn plastic article having high forming stress areas to determine if the plastic material was formed at the correct elevated temperature.

SUMMARY OF THE INVENTION

An improved process in a vacuum forming process for forming a deep drawn plastic article with a flange in an area of high forming stresses wherein a mold mounted on a base forms the shape of the article and a sheet of hot plastic material is placed over the mold and a vacuum is drawn to form the plastic sheet into the shape of the mold to form the article. The improved process provides forming a character in the mold portion that forms the flange in the area of the high forming stresses, said character having dimensions such as that properly heated plastic sheet material will be imprinted with the character and have a predetermined clarity during molding. A sheet of plastic material is heated and placed over the mold and a vacuum is drawn to draw the plastic material around the mold including the mold portion that forms the flange in an area of high forming stresses having the character. The plastic material is then solidified and the article is removed from the mold. Inspection of the flange is made to determine if the imprinted character on the flange has the predetermined clarity. If it does, it means that the article was molded at the proper elevated temperature. If it does not, it means that the temperature was deficient and that subsequent stress cracking could take place in the high forming stress areas and therefore the article should be discarded.

DESCRIPTION OF THE PREFERRED EMBODIMENT

Figure 1:
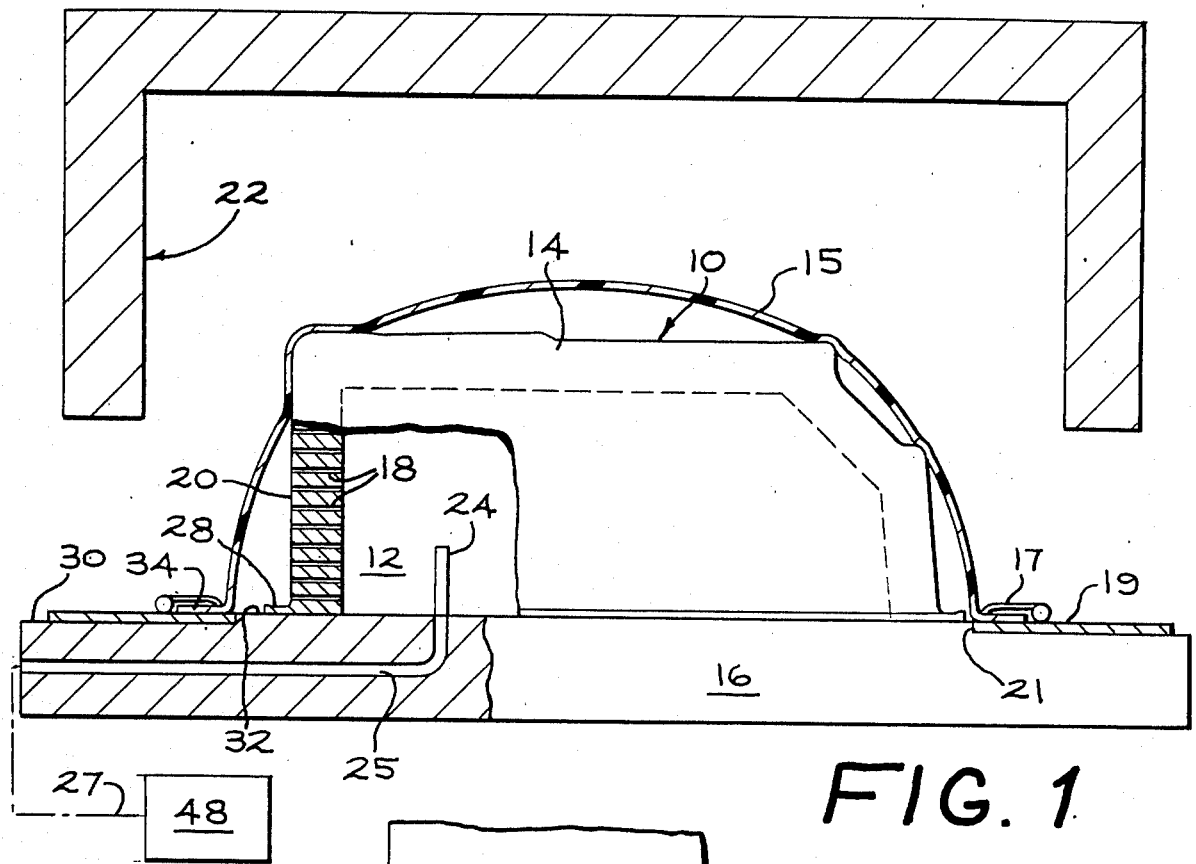
FIG. 1 is a side elevational cross-sectional view of vacuum forming process equipment showing a stage of the vacuum forming process in which hot plastic sheet material has been blown into a bubble and the mold is positioned inside the bubble ready for vacuum forming.
Figure 2:
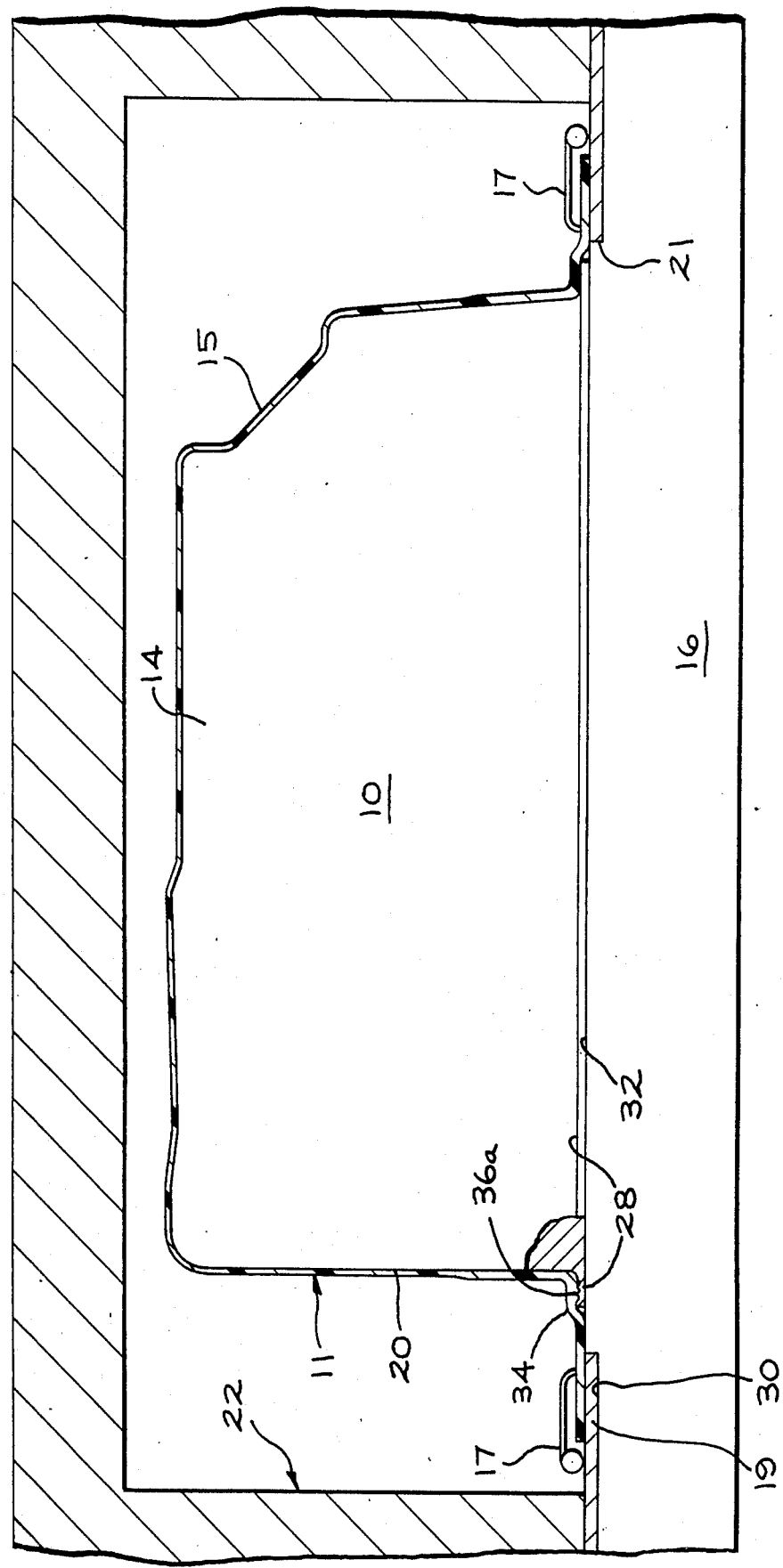
FIG. 2 is a side elevational cross-sectional view of vacuum forming process equipment showing the completion of forming the article around the mold.

With reference to the drawing, there is shown in FIG. 1 vacuum forming equipment including a mold 10 used in a vacuum forming process for forming a deep drawn plastic article 11 (FIG. 2) such as liners for household refrigerators. In one type of vacuum forming process the sheet of plastic material 15 to be formed into the article 11 is held by clamps 17 on a carrier 19 having an opening 21 under the sheet. The material is heated to soften it, then blown into a bubble and the male type mold placed inside the bubble and the plastic material is then collapsed against the mold to conform to the shape of the mold and form the article. The mold is usually made from aluminum and has a hollow cavity 12 surrounded by an outer shell 14 usually having a thickness of 4-6 inches which is mounted on a base 16. The mold has a plurality of small passageways 18 over most of the outer surface 20 which small passageways extend through the outer shell 14 and communicate with the hollow cavity 12 of the mold 10. The small passageways 18 in the mold are for removal of the air between the outer surface 20 of mold 10 and the plastic material 15 to be formed into the article. During the vacuum forming process an upper vacuum chamber wall 22 is lowered to the position shown in FIG. 2 and a vacuum pump 48 is connected to the mold by air flow conduit means 25 having one end 24 in air flow communication with the cavity 12 of the mold 10 and the other end 27 in air flow communication with the vacuum pump 48. With this arrangement when the vacuum pump is operated, it draws air through air flow conduit means 25 from the cavity 12 of the mold and through the small passageways 18 in the outer shell of the mold, thus drawing the air from between the outer surface 20 of the mold and the sheet of plastic material 15 causing the sheet of plastic material to collapse inwardly against the mold to take the shape of the mold as shown in FIG. 2. The heated plastic material then cools in the shape of the mold, thus forming the article. It will be understood that other vacuum forming arrangements may also be used, one of which is to have the small passageways 18 from the outer surface 20 of the mold connected to larger passageways in the outer shell 14 connected to the air flow conduit means 25. Another vacuum forming process is where the sheet of hot plastic material is drawn into a female type mold without forming a bubble.

As can be seen particularly in FIGS. 1 and 2, the mold 10 has at the bottom thereof a flange portion 28 on all four sides of the mold. The base 16 has a recess 30 also on all four sides of the mold and spaced outwardly of the flange portion 28. Between the flange portion 28 and the recess 30 in the base is a raised base portion 32. The deep drawn portion of the article 11 or liner is flange 34 which is formed over the flange portion 28 and it is this area that has high forming stresses and subject to stress cracking. It is therefore desirable that flange 34 be formed during the molding process from the plastic material while the plastic material is at an adequate elevated temperature so that the material will flow correctly and "relax" thereby minimizing possible stress cracking of the article in the area of high stress. It is, therefore, highly desirable to be able to determine if the flange 34 of the liner has been formed from adequately heated plastic material to produce a satisfactory article that will minimize stress cracking in the area of high forming stresses of the article.

Figure 3:
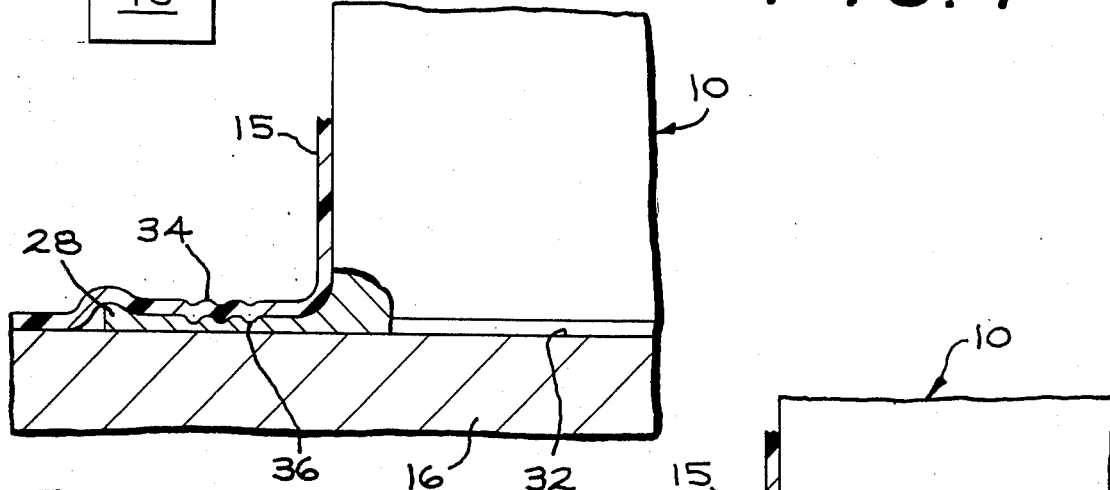
FIG. 3 is a side elevational cross-sectional view of a portion of the vacuum forming process equipment embodying the present invention and showing formation of the high stress area during the molding operation.
Figure 4:
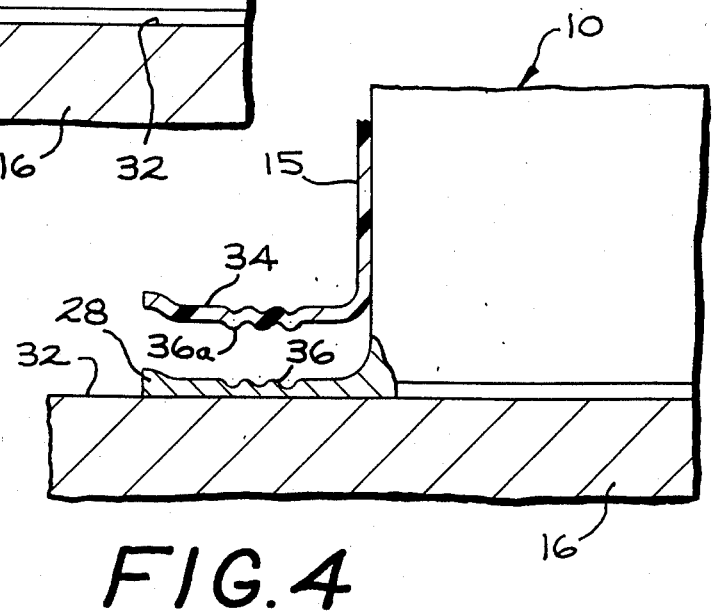
FIG. 4 is a view similar to FIG. 3 showing removal of the article from the mold in the high stress area.

With reference to FIGS. 3-7, by this invention there is provided a character 36 cut into the flange portion 28 of the mold 10 which may be of any suitable shape and is shown in the drawings as the letter "W". As shown in FIGS. 3 and 4, the character 36 has the sheet of plastic material 15 drawn into the character indentation on the flange 28 and, as can be seen, fills the entire character during the molding process. As shown in FIG. 4, the article 11 is removed from the flange portion 28 after the plastic material 15 has solidified and, as can be seen in FIG. 4, the flange 34 has a portion that has formed by pressure or imprinted with the character 36a.

Figure 5:
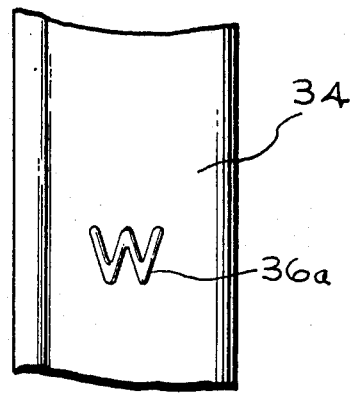
FIG. 5 is a top plan view of a section of the article formed by the vacuum forming process of the present invention showing the imprinted character having sufficient predetermined clarity to indicate adequate heating of the plastic material for the molding process.

If the sheet of plastic material has been heated to an adequate elevated temperature to minimize stress cracking in the high stress area, then the character 36a will be imprinted on the plastic sheet material with a predetermined clarity such as shown in FIG. 5. The predetermined clarity will, of course, depend upon the type of material being molded and the thickness of the area of high forming stresses such as the flange 34; however, a person having ordinary skill in the art of vacuum forming plastic articles can easily determine if the clarity of the imprinted character is such that the plastic material was adequately heated for the molding operation, thus resulting in a satisfactory molded article.

Figure 8:
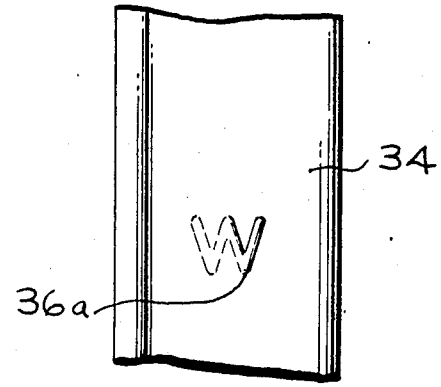
FIG. 8 is a top plan view of a section of the article formed by the vacuum forming process of the present invention showing the character having insufficient predetermined clarity indicating the sheet of plastic material was inadequately heated for the molding process.
Figure 6:
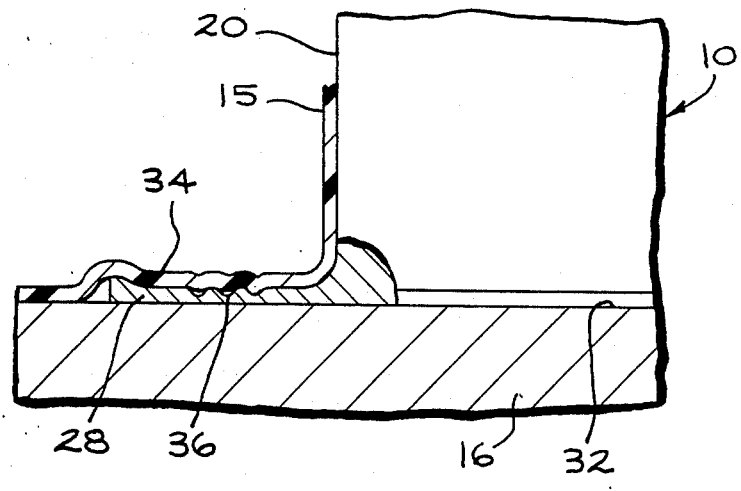
FIG. 6 is a side elevational cross-sectional view of a portion of the vacuum forming process equipment showing the article being formed in the high stress area during molding.
Figure 7:
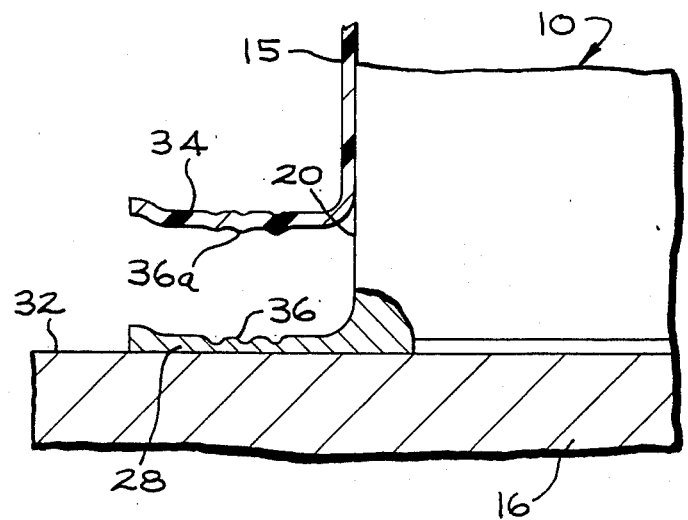
FIG. 7 is similar to FIG. 6 showing the article removed from the mold.

With reference to FIGS. 6-8, FIG. 6 is similar to FIG. 3; however, as can be seen, during the molding process the sheet of plastic material 15 does not flow into all of the area of the indented character 36 and thus upon removal of the article from the mold after solidification of the plastic material visual inspection reveals a character 36a imprinted into the flange 34 that is blurred and therefore is not of the desired predetermined clarity meaning that the plastic material was not adequately heated for the molding operation. With the formed article not having the predetermined character clarity as shown in FIG. 5 but rather is blurred as seen in FIG. 8, the article such as the refrigerator liner should be discarded and not used for subsequent assembly of refrigerators. The reason, of course, is that the inadequate forming of the article in the high forming stress area due to inadequate heating of the plastic material will subject the liner to stress cracking caused by forces during the manufacture and subsequent use of the refrigerator. The defective liner can then be reprocessed by melting and used in a subsequent molding process.

While, in accordance with the Patent Statute, there has been described what at present is considered to be the preferred method of this invention, it will be obvious to those skilled in the art that various changes and modifications may be made thereto without departing from the invention. It is, therefore, intended by the appended claims to cover all such changes and modifications as fall within the true spirit and scope of the invention.

What is claimed is:

1. In a vacuum forming process for forming a deep drawn plastic article with a flange in an area of high forming stresses wherein a mold mounted on a base forms the shape of the article and a sheet of hot plastic material is placed over the mold and a vacuum is drawn to form the plastic sheet into the shape of the mold to form the article, the improvement comprising:

forming a character in the mold portion that forms the flange in the area of the high forming stresses, said character having dimensions such that properly heated plastic sheet material will be imprinted with the character and have a predetermined clarity during molding, placing a heated sheet of plastic material over the mold, drawing a vacuum to draw the plastic material around the mold including the mold portion that forms the flange in an area of high forming stresses, solidifying the plastic material, removing the formed article from the mold, inspecting the flange to determine if the imprinted character has the predetermined clarity, discarding the deep drawn plastic article if the imprinted character does not have the predetermined clarity.

2. In the vacuum forming process of claim 1 wherein forming a character in the mold portion that forms the flange is by cutting the character into the mold.

3. In the vacuum forming process of claim 1 wherein after placing a heated sheet of plastic material over the mold the sheet is formed into a bubble prior to drawing a vacuum.

* * * * *